(12) United States Patent
Haase et al.

(10) Patent No.: US 8,646,828 B2
(45) Date of Patent: Feb. 11, 2014

(54) SUNSHADE ASSEMBLY FOR A VEHICLE

(75) Inventors: Charles Stephen Haase, Delaware, OH (US); Shinichi Yamase, Dublin, OH (US); Generoso Tan Sia, Jr., Plain City, OH (US); Ruben E. Guanzon, Powell, OH (US); Ryuichi Fukuyama, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 56 days.

(21) Appl. No.: 12/870,976

(22) Filed: Aug. 30, 2010

(65) Prior Publication Data

US 2012/0049564 A1    Mar. 1, 2012

(51) Int. Cl.
*B60J 5/00* (2006.01)
*B60J 1/20* (2006.01)

(52) U.S. Cl.
USPC ............... 296/97.9; 296/97.8; 296/146.1

(58) Field of Classification Search
USPC ............ 296/97.8, 97.1, 146.7, 146.1, 190.1, 296/146.2
See application file for complete search history.

(56) References Cited

U.S. PATENT DOCUMENTS

| | | | |
|---|---|---|---|
| 2,594,813 A | | 4/1952 | Seibert |
| 3,183,033 A | * | 5/1965 | Stulbach ............... 296/97.2 |
| 4,869,542 A | | 9/1989 | Lin |
| 5,089,912 A | * | 2/1992 | Simin ................... 359/608 |
| 5,653,277 A | | 8/1997 | Kerner et al. |
| 7,401,840 B2 | * | 7/2008 | Schnoblen et al. ......... 296/143 |
| 7,661,703 B2 | * | 2/2010 | Ono et al. ............... 280/730.2 |
| 2003/0205267 A1 | | 11/2003 | Lin |
| 2009/0205792 A1 | | 8/2009 | Brendel et al. |

FOREIGN PATENT DOCUMENTS

JP    2001341525 A    12/2001

* cited by examiner

*Primary Examiner* — Glenn Dayoan
*Assistant Examiner* — Melissa A Black
(74) *Attorney, Agent, or Firm* — Fay Sharpe LLP

(57) ABSTRACT

A sunshade assembly wherein the sunshade is secured in a deployed position at a single location, and wherein when the sunshade is retracted, the field of view through the window is unobstructed by securing members or the like. More particularly, the sunshade assembly utilizes a recessed hook or hook retainer within a trim panel adjacent the window as an anchor point, while a handgrip secured to the window shade is configured to pivot into a position to permit a hook or hook retainer associated therewith to be inserted into the recessed anchor point.

19 Claims, 7 Drawing Sheets

SUNSHADE ASSEMBLY FOR A VEHICLE

BACKGROUND

This disclosure relates to a sunshade assembly for a vehicle and, more particularly to a retractable sunshade assembly for shading a window of a vehicle. For purposes of this application, a sunshade is a screen (often retractable) that is typically used to shade a rear window associated with a rear seat while a sun visor is mounted in front of the driver and/or front seat passenger.

A basic sunshade assembly may generally include a sunshade screen mounted on a retractable roller, and at least one hook or other attachment mechanism for securing the sunscreen in a deployed position for shading a window. Currently, there are generally two basic ways in which a sunshade is secured in a deployed position. A first design typically employs a pair of hooks attached to a body or frame of the vehicle near the window such that the sunshade can be extended and secured to the hooks. Most often, a rod member around which a leading edge of the sunshade is wrapped and secured is designed to be received and retained by the hooks. A second design employs a pair of hooks that are associated with the sunshade, whereby a pair of corresponding hook retainers or catches are provided adjacent the window for receiving and retaining the hooks.

In either design, the hooks or hook retainers mounted near the window tend to obstruct the view through the window and/or otherwise result in an unfinished appearance about the window. This is particularly the case in smaller windows, such as those often found in vehicles with third-row seating where such rear windows are typically smaller and any obstructions are therefore more noticeable to vehicle occupants. Moreover, such designs can be somewhat cumbersome in operation since they require the user to attach the sunshade at two locations.

SUMMARY

A sunshade assembly system wherein the sunshade is secured in a deployed position at a single location, and wherein when the sunshade is retracted, the field of view through the window is unobstructed by securing members or the like. More particularly, the sunshade assembly utilizes a recessed hook or hook retainer within a trim panel adjacent the window as an anchor point, while a handgrip secured to the window shade is configured to pivot into a position to permit a hook or hook retainer associated therewith to be inserted into the recessed anchor point.

Accordingly a sunshade assembly for a window of a vehicle comprises a retractable sunshade movable between a stowed position and a deployed position for shading the window, and a first trim panel for concealing a retracted portion of the sunshade and having an opening through which the sunshade extends for movement between the stowed position and the deployed position. A first securing member includes a hook or hook retainer portion on an end thereof and a handgrip portion, the first securing member is attached to the sunshade at a generally centered location between the hook portion and handgrip portion. A second securing member is provided within a recess of a second trim panel opposite the first trim panel and has a corresponding hook or hook retainer configured to engage with the hook or hook retainer of the first securing member to secure the sunshade in the deployed position. When the sunshade is in the stowed position, the first securing member interferes with the surfaces of the trim panel surrounding the opening through which the sunshade extends to thereby restrict further retraction of the sunshade. The first securing member is also adapted to pivot about its point of attachment to the sunshade so as to present the hook or hook retainer portion thereof for extension into the recess of the second trim panel for engaging with the second securing member when the sunshade is moved to the deployed position.

The first securing member can be generally perpendicular to a face of the sunshade when in the stowed position. The securing member can be generally parallel to a face of the sunshade when in the deployed position. The first securing member can further comprise an elongated portion including the hook or hook retainer, the elongated portion adapted for insertion into the recess of the send trim member.

The sunshade can be wound around a storage roller. The leading terminal edge of the sunshade can be generally planar and can further comprise a planar stiffening member at its leading terminal edge. The planar stiffening member can include at least one plastic element ultrasonically welded to the sunshade.

According to another aspect, a sunshade assembly for shading a window of a vehicle comprises a sunshade movable between a stowed position and a deployed position for shading the window, and a securing mechanism for securing the sunshade in the deployed position. The securing mechanism includes a first securing member associated with the sunshade and a second securing member mounted adjacent the window, the first and second securing members being configured to interlock to secure the sunshade in the deployed position. The second securing member is spaced apart from the window and recessed within a trim member so as not to obstruct a field of view through the window when the sunshade is in the stowed position.

The first securing member can include a hook and the second securing member can include a pin, the hook being adapted to engage the pin to secure the sunshade in the deployed position. The first securing member can be generally perpendicular to a face of the sunshade when in the stowed position. The first securing member can be generally parallel to a face of the sunshade when in the deployed position. The second securing member can be located in a recess, and the first securing member can further comprise an elongated portion including the hook or hook retainer, the elongated portion adapted to be inserted into the recess to access the recessed second securing member.

The sunshade can be wound around a storage roller, which may be spring loaded for retraction. The leading terminal edge of the sunshade is can be generally planar, and a planar stiffening member can be provided at its leading terminal edge. The planar stiffening member can include at least one plastic member ultrasonically welded to the sunshade. The first securing member can be attached to the sunshade and configured to pivot between a first position associated with the stowed position of the sunshade and a second position associated with the deployed position for engaging the second securing member. A vehicle having at least one window and a sunshade assembly as set forth above is also provided.

DETAILED DESCRIPTION

Figure 1:
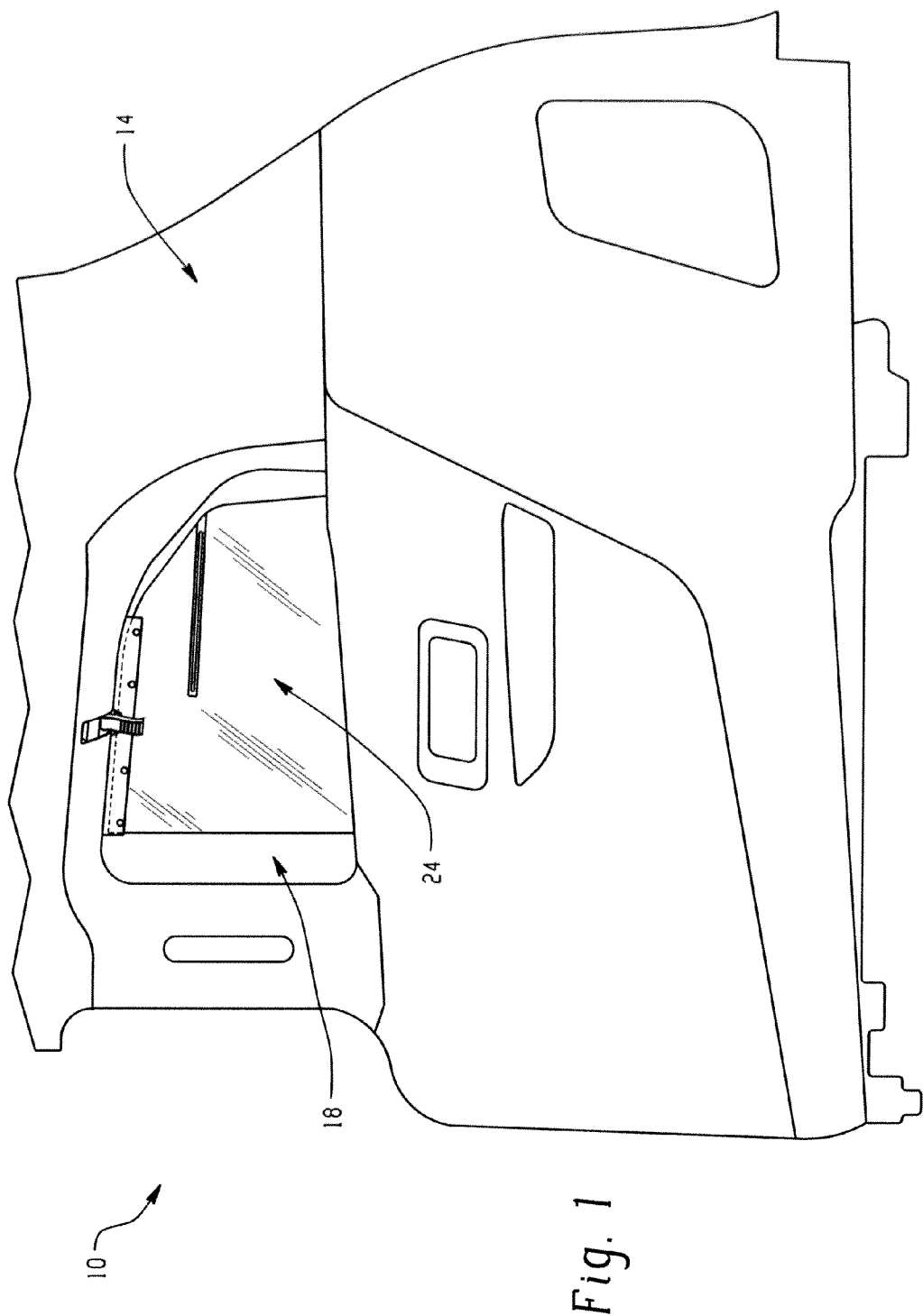
FIG. 1 is a perspective view of an interior of a vehicle including an exemplary sunshade assembly in accordance with the disclosure.

Referring initially to FIG. 1, a right side quarter panel of a vehicle 10 is generally identified by reference numeral 14. As will be appreciated, the quarter panel 14 is typically the rear most side body panel of the vehicle 10, and as illustrated can include a window 18, often referred to as a quarter window. In many vehicles, and particularly in SUVs and minivans, the quarter window may be adjacent a third-row seat. A sunshade assembly 24 in accordance with the disclosure is mounted about the quarter window 18 for shading the interior of the vehicle.

Figure 2:
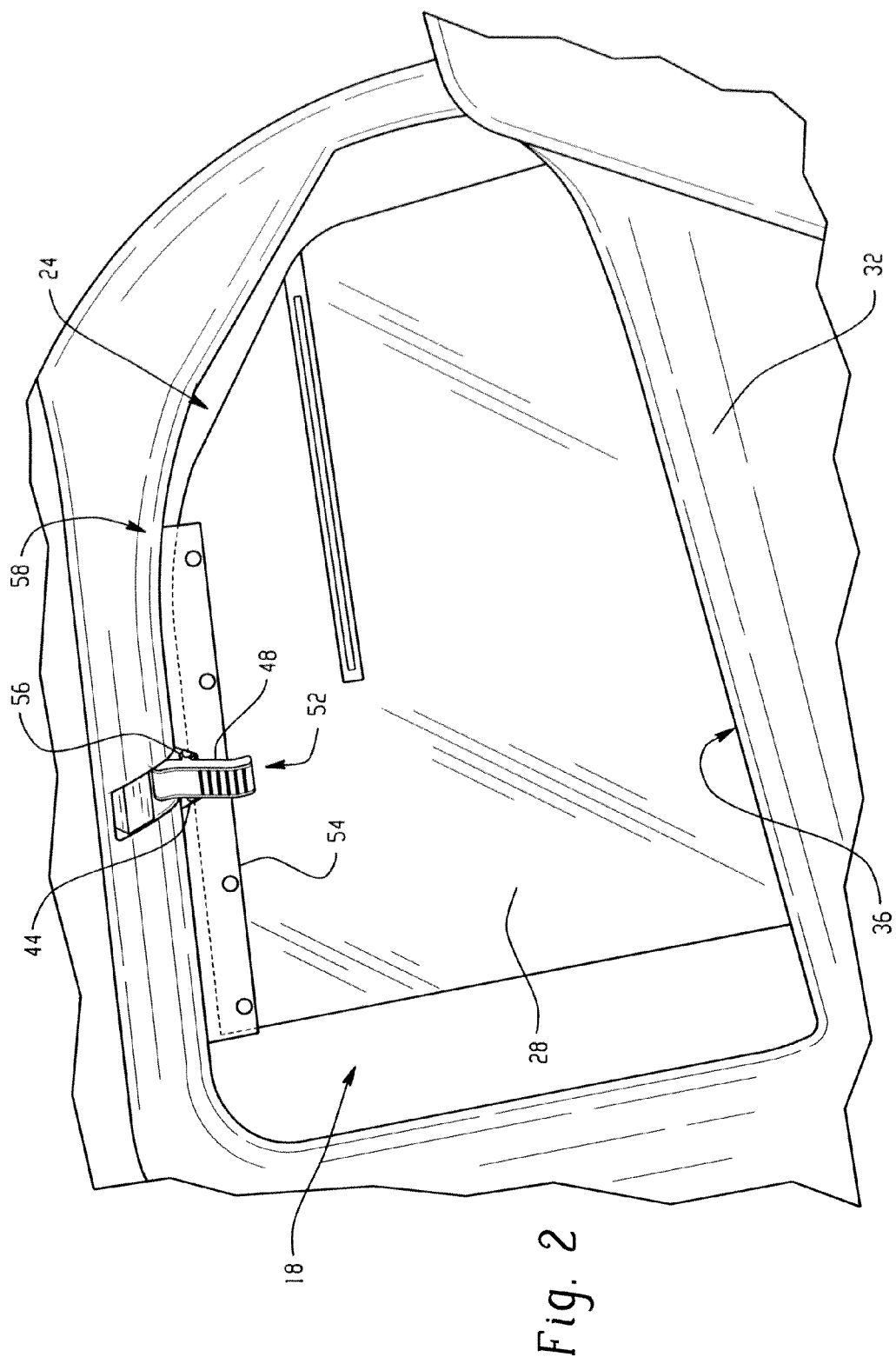
FIG. 2 is an enlarged portion of FIG. 1, illustrating the exemplary sunshade assembly in a deployed position, shading a window of the vehicle.
Figure 3:
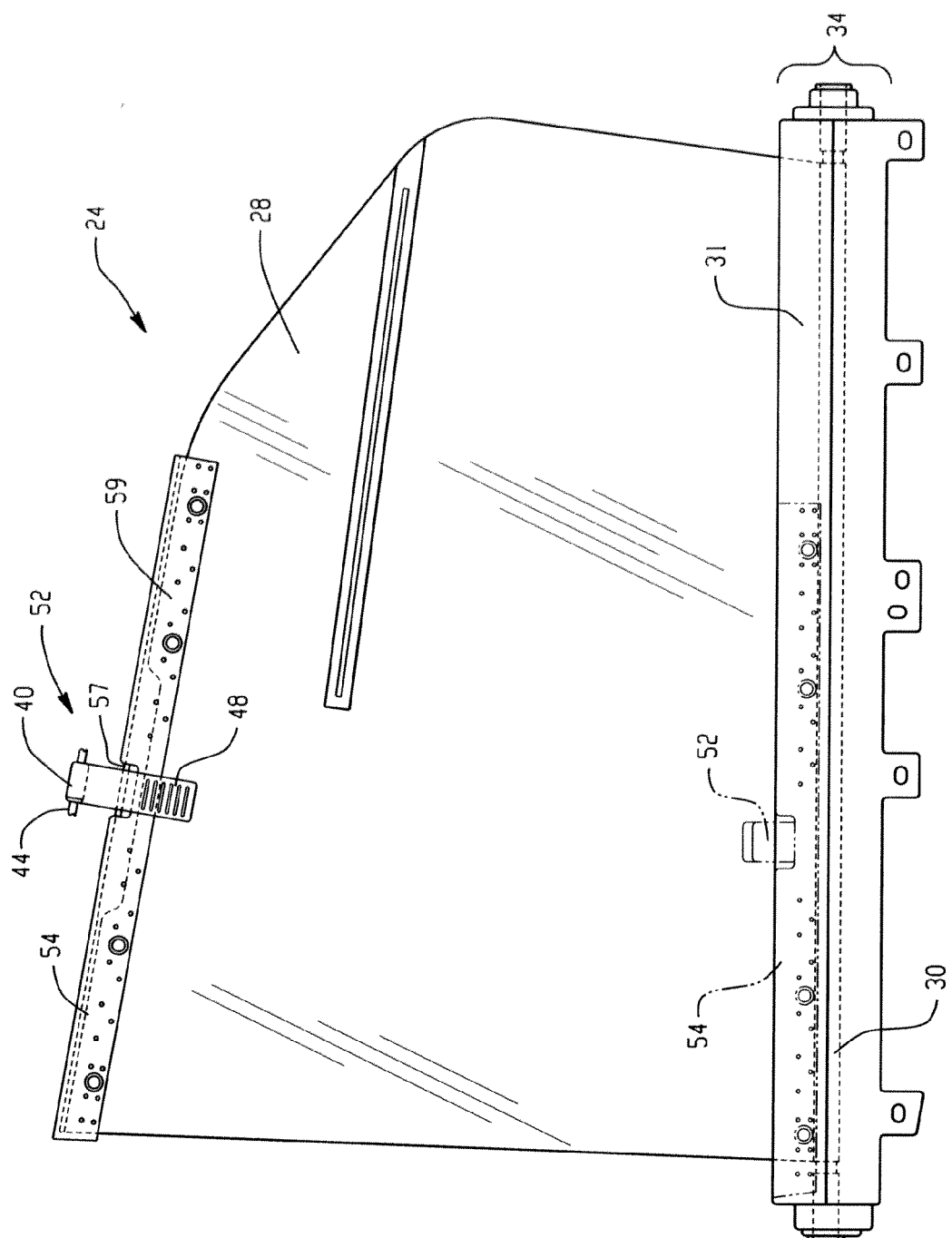
FIG. 3 is a front elevation view of the exemplary sunshade in a deployed position, with the stowed position of the sunshade illustrated in phantom.

Turning to FIGS. 2 and 3, the sunshade assembly 24 is illustrated in a deployed position and generally includes a retractable sunshade 28 movable between a stowed position (not shown in FIG. 2) and the deployed position for shading the window 18. The sunshade 28 may typically be made from a mesh or mesh-like fabric, or the like, and is wound on a retractable roller 30 supported within a housing 31 that is mounted in a lower trim panel 32 below the window 18. The lower trim panel 32 generally conceals the roller 30 and housing 31 and a retracted portion 34 of the sunshade 28. As will be appreciated, FIG. 3 also illustrates the sunshade 28 in the stowed position with substantially the entire sunshade 28 being wound around the roller 30, such position being illustrated in phantom and described in more detail below.

The trim panel 32 has an opening in the form of slot 36 (best shown and described below in connection with FIG. 8) through which the sunshade 28 extends for movement between the stowed position and the deployed position. First and second interlocking securing members in the form of a hook 40 and rod 44 (also referred to as a hook retainer) are provided for securing the sunshade 28 in the deployed position for shading the window 18.

Figure 4:
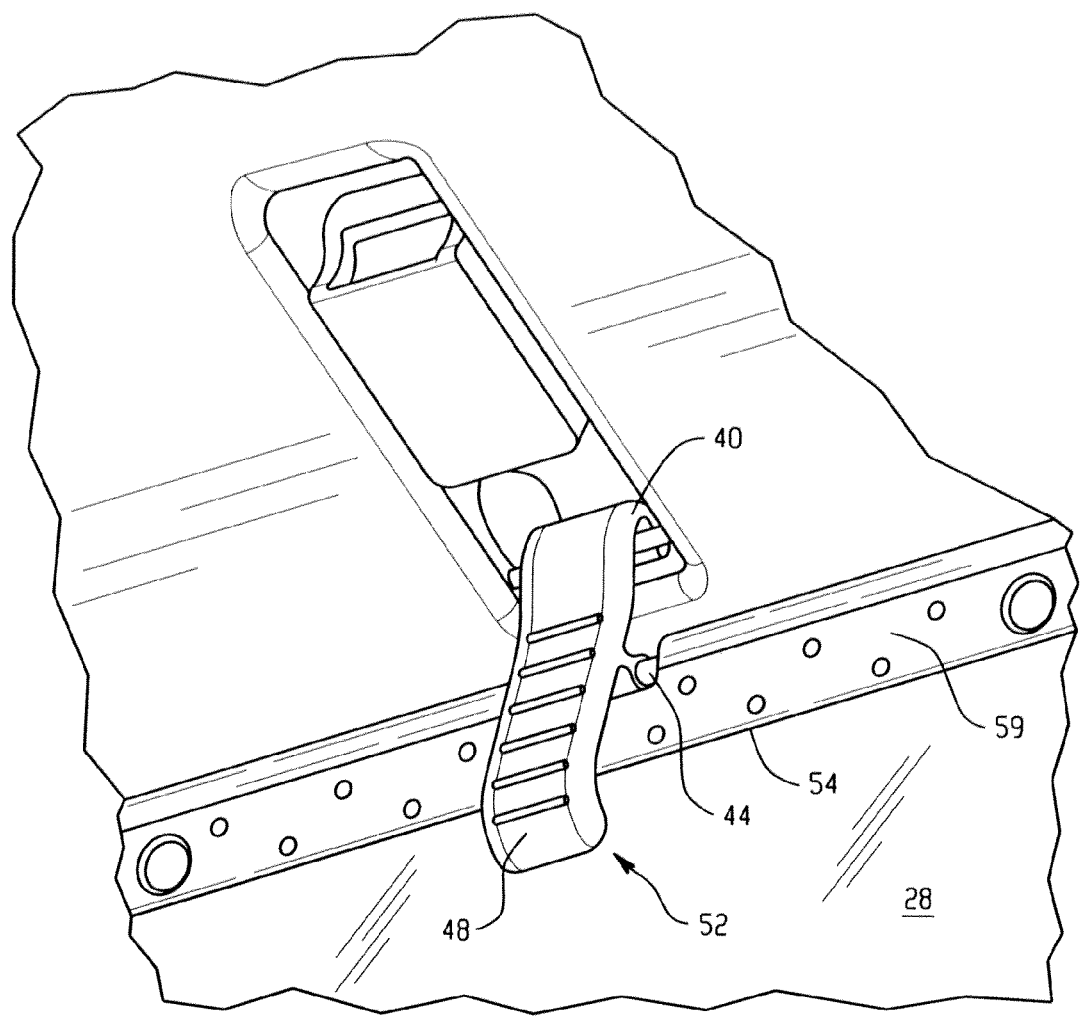
FIG. 4 is an enlarged portion of FIG. 2, illustrating the exemplary sunshade assembly secured in the deployed position by cooperating securing members.
Figure 5:
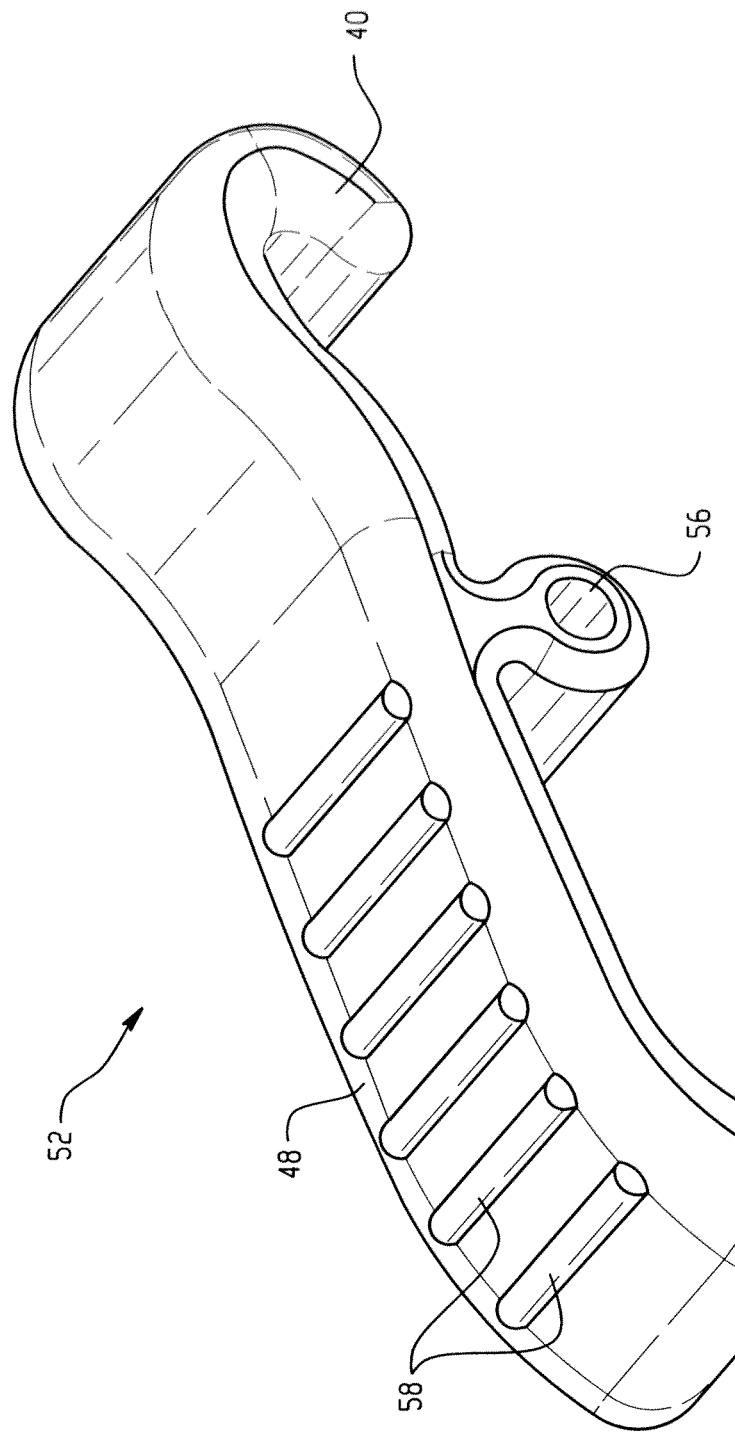
FIG. 5 is a detailed view of a combination handgrip/hook member in accordance with the disclosure.

As best shown in FIGS. 4 and 5, the hook 40 is formed integrally with a handgrip 48, the two components being collectively referred to as an integral (combined) handgrip/hook member and identified by reference numeral 52. The integral handgrip/hook member 52 can be formed as a unitary piece, such as via a suitable molding process, and may contain a plurality of ridges 58 for enhancing a user's grip during operation. The integral handgrip/hook member 52 is generally elongate and is secured to a leading edge 54 of the sunshade 28 at a generally centered location between its hook portion 40 and handgrip portion 48. In this regard, an eye 56 is provided for pivotal attachment to a corresponding element associated with the leading edge 54 of the sunshade 28 (as seen in FIG. 3).

Returning to FIG. 3, the leading edge 54 of the sunshade 28 includes a generally planar stiffening member in the form of a pair of planar stiffening plates 59 secured to opposing sides of the sunshade 28, such as by ultrasonic welding or via a suitable adhesive. The stiffening plates 59 can also be configured so as to mechanically interlock to each other and the sunshade 28, or can be attached with suitable fasteners. The stiffening plates 59 support the sunshade 28 across its width to prevent curling or sagging of the leading edge 54 of the sunshade 28 when in the deployed position. A pin 57, to which the handgrip/hook member 52 is attached, is supported by at least one of the stiffening plates 59. Together the eye 56 and pin 57 allow the integral handgrip/hook member 52 to pivot with respect to the sunshade 28 in order for the hook portion 40 to access the rod 44, as will now be described.

Figure 6:
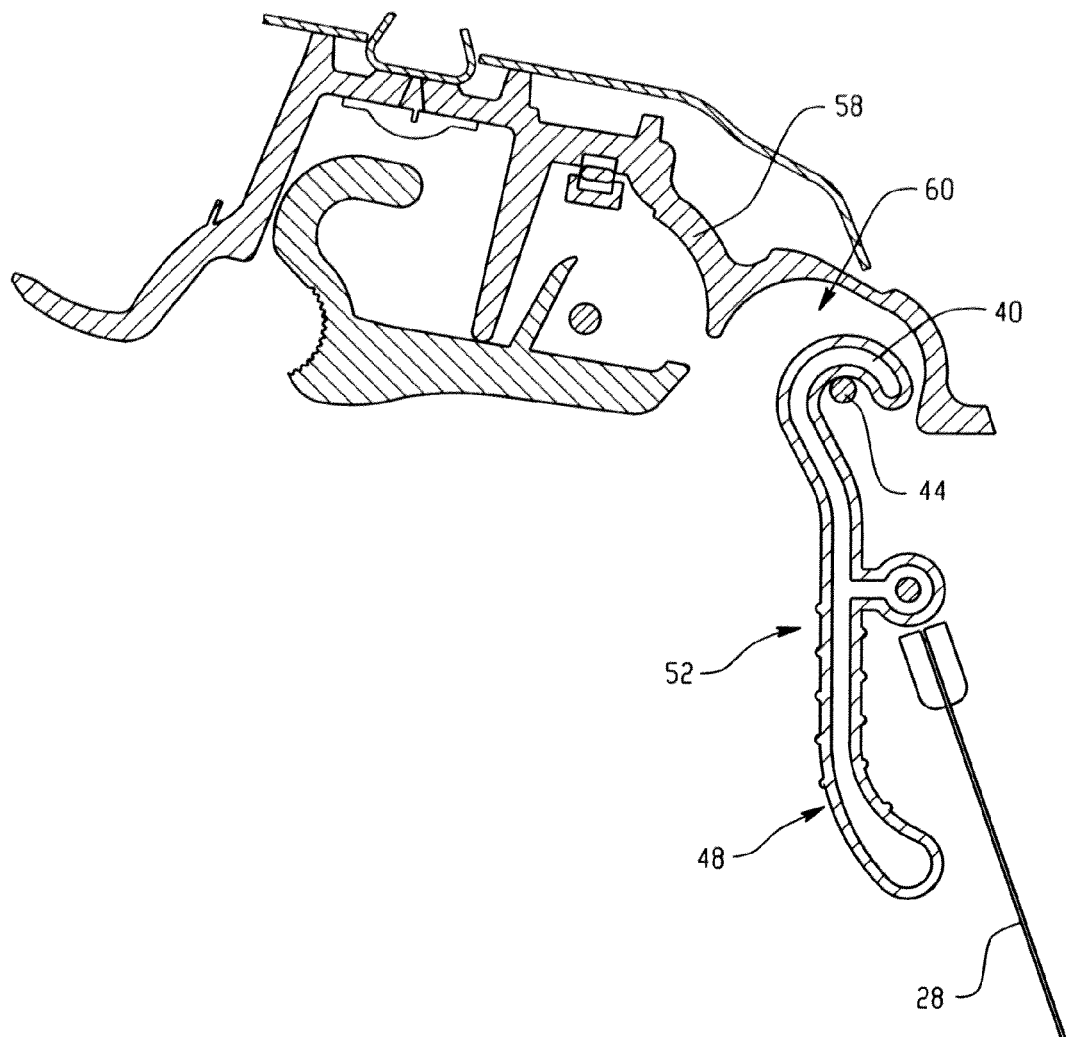
FIG. 6 is a cross-sectional view taken through the cooperating securing members of the exemplary sunshade assembly.

Referring to FIG. 6, the rod 44 is located within a recess 60 of an upper trim panel 58, opposite the lower trim panel 32, and adjacent the window 18. As will be appreciated, the hook portion 40 of the integral handgrip/hook member 54 is configured to be inserted into the recess 60 to engage the rod 44 as illustrated to thereby secure the sunshade 28 in the deployed position. In this regard, the elongate shape and/or size of the combined handgrip/hook member 54 is configured to allow a user to readily grasp the handgrip portion 48 to manipulate the hook portion 40 so as to insert it or withdraw it from the recess 60.

In contrast to conventional sunshade assemblies that utilize one or more hooks that protrude from a trim panel adjacent the window, the rod 44 is recessed such that it is generally flush with the surface of the upper trim panel 58, or at least does not protrude from the trim panel into the cabin of the vehicle. This maintains an unobstructed view through the window 18 when the sunshade 28 is in the stowed position, and provides a clean and finished look to the trim panel.

Figure 7:
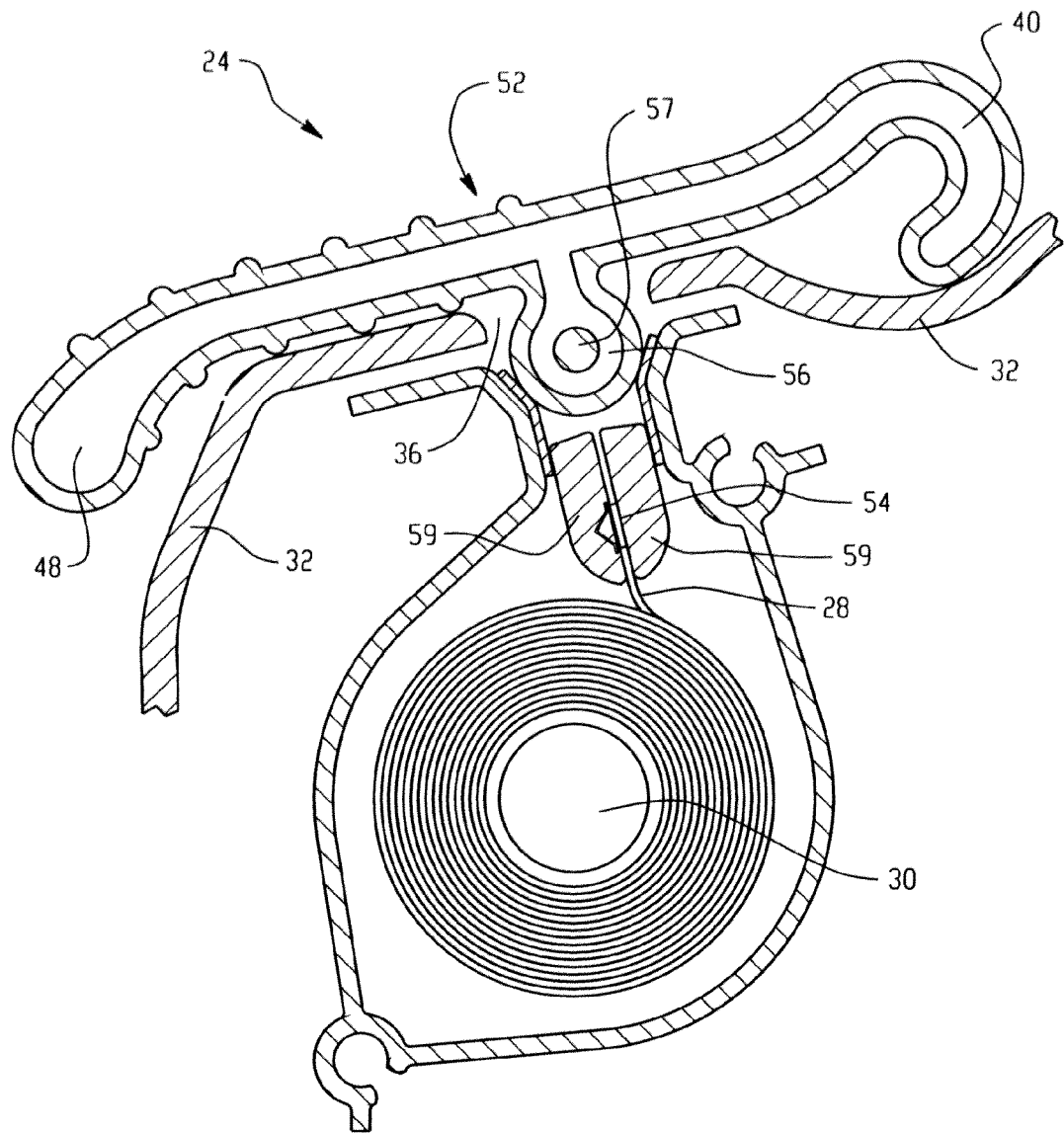
FIG. 7 is a cross-sectional view of the exemplary sunshade assembly in a stowed position.

Turning to FIG. 7, the sunshade assembly 24 is illustrated in cross-section in the stowed position wherein a majority of the sunshade 28 is retracted into the lower trim panel 32 and/or wound around the roller 30. As will be appreciated, when the sunshade 28 is in the stowed position, the combined handgrip/hook member 54 may interfere with one or more surfaces of the trim panel 32 surrounding the slot 36 through which the sunshade 28 is configured to extend, thereby restricting further retraction of the sunshade 24. In this regard, the trim panel 32 has depressed portion 62 thereof for receiving the hook portion 40 such that the combined handgrip/hook member 54 can lay in close relation to the trim panel 32 to provide a clean and finished look.

As will now be appreciated, the handgrip/hook member 52 is pivotally attached to the leading edge 54 of the sunshade 28 so that it can pivot from the position shown in FIGS. 2 and 3, corresponding to the deployed position of the sunshade 28, to the position shown in FIG. 7, corresponding to the stowed position of the sunshade 28, and vice versa. In the illustrated embodiment, the combined handgrip/hook member 52 is configured to pivot approximately 90 degrees relative to the surface of the deployed sunshade 28 (e.g., the portion not wound around the roller 30) from substantially parallel in FIGS. 2 and 3 to substantially perpendicular in FIG. 7.

The operation of the sunshade assembly 24 will now be described. To extend the sunshade 28 to the deployed position, a user typically grasps the combined handgrip/hook member 52 and, beginning from the position shown in FIG. 7, draws the sunshade 28 upwardly through slot 36 until enough of the sunshade 28 has been extended to permit the hook 40 to reach the rod 44. During movement from the stowed position to the deployed position, the combined handgrip/hook member 52 is adapted to pivot about its point of attachment to the sunshade 28 so as to present the hook 40 for extension into the recess 60 of the upper trim panel 58 for engagement with the rod 44. As will be appreciated, the rotation of the combined handgrip/hook member 52 is in most instances a natural result of the movement of the user's hand from the position of FIG.

7 to the position of FIG. 3. That is, as a user raises the sunshade 28, his or her hand may naturally tend to rotate the combined handgrip/hook member 54 so as to present the hook portion 40 for insertion into the recess for engaging with the rod 44. Accordingly, this provides for intuitive operation of the sunshade assembly 24, even for many users without prior experience with the exemplary sunshade assembly 24.

Although the exemplary embodiment described herein is shown in the context of a rear window of a vehicle (e.g., quarter window), it will be appreciated that aspects of the disclosure are applicable to a variety of different window types and locations.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A sunshade assembly for a window of a vehicle comprising:
   a retractable sunshade movable between a stowed position and a deployed position for shading the window;
   a first trim panel for concealing a retracted portion of the sunshade and having an opening through which the sunshade extends for movement between the stowed position and the deployed position;
   a first securing member including a hook or hook retainer portion on an end thereof and a handgrip portion, the first securing member attached to the sunshade at a generally centered location between the hook portion and handgrip portion; and
   a second securing member within a recess of a second trim panel opposite the first trim panel and having a corresponding hook or hook retainer configured to engage with the hook or hook retainer of the first securing member to secure the sunshade in the deployed position;
   wherein when the sunshade is in the stowed position, the first securing member interferes with the surfaces of the trim panel surrounding the opening through which the sunshade extends to thereby restrict further retraction of the sunshade;
   wherein the first securing member is adapted to pivot about its point of attachment to the sunshade so as to present the hook or hook retainer portion thereof for extension into the recess of the second trim panel for engaging with the second securing member when the sunshade is moved to the deployed position; and
   wherein the first securing member has a longitudinal axis that is generally perpendicular to a face of the sunshade when in the stowed position, the hook or hook retainer portion and the handgrip portion being a unitary structure aligned along said longitudinal axis.

2. A sunshade assembly for a window as set forth in claim 1, wherein the first securing member has a longitudinal axis that is generally parallel to a face of the sunshade when in the deployed position.

3. A sunshade assembly for a window as set forth in claim 1, wherein the first securing member further comprises an elongated portion including the hook or hook retainer, the elongated portion adapted for insertion into the recess of the second trim panel.

4. A sunshade assembly for a window as set forth in claim 1, further comprising a storage roller around which the sunshade is wound.

5. A sunshade assembly for a window as set forth in claim 1, wherein the leading terminal edge of the sunshade is generally planar.

6. A sunshade assembly for a window as set forth in claim 1, wherein the sunshade further comprises a planar stiffening member at its leading terminal edge.

7. A sunshade assembly for a window as set forth in claim 6, wherein the planar stiffening member includes at least one plastic element ultrasonically welded to the sunshade.

8. A vehicle comprising at least one window and a sunshade assembly as set forth in claim 1 mounted about the window.

9. A sunshade assembly for a window of a vehicle comprising:
   a sunshade movable between a stowed position and a deployed position for shading the window;
   a first securing member including a hook or hook retainer portion on an end thereof and a handgrip portion, the hook or hook retainer portion and the handgrip portion being a monolithic structure pivotally attached to the sunshade; and
   a second securing member mounted in a recess adjacent the window and having a corresponding hook or hook retainer configured to engage with the hook or hook retainer of the first securing member to secure the sunshade in the deployed position;
   wherein the first securing member is adapted to pivot about its point of attachment to the sunshade so as to change an orientation of the hook or hook retainer portion to present the hook or hook retainer portion thereof for extension into the recess for engaging with the second securing member when the sunshade is moved to the deployed position.

10. A sunshade assembly as set forth in claim 9, wherein the first securing member includes a hook and the second securing member includes a pin, the hook adapted to engage the pin to secure the sunshade in the deployed position.

11. A sunshade assembly as set forth in claim 9, wherein the first securing member is generally perpendicular to a face of the sunshade when in the stowed position.

12. A sunshade assembly as set forth in claim 9, wherein the first securing member is generally parallel to a face of the sunshade when in the deployed position with the handgrip portion of the first securing member coextensive along a major portion of its length with a portion of the sunshade, and the hook or hook retainer portion of the first securing member spaced beyond a leading edge of the sunshade.

13. A sunshade assembly as set forth in claim 9, wherein the second securing member is located in a recess, and wherein the first securing member further comprises an elongated portion including the hook or hook retainer, the elongated portion adapted to be inserted into the recess to access the recessed second securing member.

14. A sunshade assembly as set forth in claim 9, further comprising a storage roller around which the sunshade is wound.

15. A sunshade assembly as set forth in claim 9, wherein the leading terminal edge of the sunshade is generally planar.

16. A sunshade assembly as set forth in claim 9, wherein the sunshade further comprises a planar stiffening member at its leading terminal edge.

17. A sunshade assembly as set forth in claim 16, wherein the planar stiffening member includes at least one plastic member ultrasonically welded to the sunshade.

18. A vehicle comprising at least one window and a sunshade assembly as set forth in claim 9.

19. A sunshade assembly for a window of a vehicle comprising:
- a retractable sunshade movable between a stowed position and a deployed position for shading the window;
- a first trim panel for concealing a retracted portion of the sunshade and having an opening through which the sunshade extends for movement between the stowed position and the deployed position;
- a first securing member including a hook or hook retainer portion on an end thereof and a handgrip portion, the first securing member attached to the sunshade at a generally centered location between the hook portion and handgrip portion; and
- a second securing member within a recess of a second trim panel opposite the first trim panel and having a corresponding hook or hook retainer configured to engage with the hook or hook retainer of the first securing member to secure the sunshade in the deployed position;
- wherein when the sunshade is in the stowed position, the first securing member interferes with the surfaces of the trim panel surrounding the opening through which the sunshade extends to thereby restrict further retraction of the sunshade;
- wherein the first securing member is adapted to pivot about its point of attachment to the sunshade so as to present the hook or hook retainer portion thereof for extension into the recess of the second trim panel for engaging with the second securing member when the sunshade is moved to the deployed position; and, wherein the hook or hook retainer portion and the handgrip portion are a unitary structure, and whereby pivoting movement of the handgrip portion relative to the sunshade about its point of attachment to the sunshade results in a corresponding movement of the hook or hook retainer portion, wherein the first securing member is movable from a first position having the hook or hook retain portion and the handgrip portion on opposing sides of the sunshade, to a second position having the handgrip portion coextensive along a major portion of its length with a portion of the sunshade, and the hook or hook retainer portion spaced beyond a leading edge of the sunshade.

* * * * *